United States Patent
Schumacher et al.

(10) Patent No.: US 12,399,728 B1
(45) Date of Patent: Aug. 26, 2025

(54) APPARATUS AND METHOD FOR GENERATING A USER INTERFACE AS A FUNCTION OF A SELECTED ACTION

(71) Applicant: Quick Quack Car Wash Holdings, LLC, Roseville, CA (US)

(72) Inventors: Josh David Schumacher, Sacramento, CA (US); Joseph Allen Steele, III, Plumas Lake, CA (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/635,335

(22) Filed: Apr. 15, 2024

(51) Int. Cl.
  *G06F 17/00* (2019.01)
  *G06F 9/451* (2018.01)
  *G06F 21/31* (2013.01)

(52) U.S. Cl.
  CPC .............. *G06F 9/451* (2018.02); *G06F 21/31* (2013.01)

(58) Field of Classification Search
  CPC ................................. G06F 9/451; G06F 21/31
  See application file for complete search history.

(56) References Cited

U.S. PATENT DOCUMENTS

| | | | | |
|---|---|---|---|---|
| 7,761,885 | B2* | 7/2010 | Labrou | G06F 9/465 719/330 |
| 8,291,408 | B1* | 10/2012 | Czymontek | G06F 8/34 717/113 |
| 10,922,743 | B1* | 2/2021 | Andrizzi | G06Q 30/0633 |
| 11,311,797 | B2* | 4/2022 | Rose | G06Q 20/385 |
| 11,443,260 | B1* | 9/2022 | van Breen | G08G 1/095 |
| 11,635,889 | B1* | 4/2023 | Swanson | G06F 3/0481 715/764 |
| 2005/0089016 | A1* | 4/2005 | Zhang | H04L 47/283 370/351 |
| 2005/0116667 | A1* | 6/2005 | Mueller | G09F 19/22 315/312 |
| 2007/0088583 | A1* | 4/2007 | Chen | G06Q 10/0633 705/7.27 |
| 2008/0293375 | A1* | 11/2008 | Swanburg | H04M 11/002 455/405 |
| 2012/0287281 | A1* | 11/2012 | Williams | G06Q 30/02 348/148 |

(Continued)

FOREIGN PATENT DOCUMENTS

| | | |
|---|---|---|
| DE | 102013217854 A1 | 3/2014 |
| JP | 2002063648 A | 2/2002 |

*Primary Examiner* — Mohammed H Zuberi
(74) *Attorney, Agent, or Firm* — Caldwell Intellectual Property Law

(57) ABSTRACT

Apparatus and method for generating a user interface as a function of a selected action are disclosed. The apparatus includes at least a processor and a memory containing instructions configuring the at least a processor to receive at least a verification datum, authorize a user as a function of the at least a verification datum, wherein authorizing further includes retrieving user data as a function of the at least a verification datum, receive at least a selected action from a display device, generate an activation command as a function of the at least a selected action, wherein the activation command is configured to activate the at least a selected action and generating the activation command further includes generating at least a token as a function of the activation command and update a user interface data structure as a function of the at least a token.

20 Claims, 7 Drawing Sheets

(56) References Cited

U.S. PATENT DOCUMENTS

| | | | |
|---|---|---|---|
| 2013/0027227 A1* | 1/2013 | Nordstrom | G01C 21/3438 340/990 |
| 2013/0252544 A1* | 9/2013 | Leutgeb | H04B 5/72 455/41.1 |
| 2014/0100692 A1* | 4/2014 | Chittenden, Jr. | G07F 13/025 700/236 |
| 2014/0330720 A1 | 11/2014 | Tomlin | |
| 2015/0347374 A1* | 12/2015 | Rehtijärvi | G06F 21/57 715/747 |
| 2016/0059831 A1* | 3/2016 | Belanger | B60S 3/04 134/56 R |
| 2016/0264104 A1* | 9/2016 | Belanger | B60S 3/002 |
| 2017/0180345 A1* | 6/2017 | Mohan | H04L 63/083 |
| 2017/0300281 A1* | 10/2017 | Feldman | H04L 67/34 |
| 2018/0075567 A1* | 3/2018 | Mycroft | B67D 7/0401 |
| 2018/0144256 A1* | 5/2018 | Saxena | G06N 20/00 |
| 2018/0246961 A1* | 8/2018 | Gibson | H04N 21/2407 |
| 2019/0379653 A1* | 12/2019 | Mead | H04L 63/1408 |
| 2020/0005284 A1* | 1/2020 | Vijayan | G06Q 20/065 |
| 2020/0126137 A1* | 4/2020 | Pilkington | G06Q 30/0611 |
| 2020/0213121 A1* | 7/2020 | Hioki | H04L 9/3239 |
| 2020/0242105 A1* | 7/2020 | Rich | H04L 9/40 |
| 2020/0384960 A1* | 12/2020 | Mayer | G06K 7/10386 |
| 2021/0070304 A1* | 3/2021 | Weldemariam | B60W 40/06 |
| 2022/0069996 A1* | 3/2022 | Xue | H04L 9/3297 |
| 2022/0245608 A1* | 8/2022 | Burchetta | G06Q 20/1235 |
| 2023/0169612 A1* | 6/2023 | Liguori | G06N 20/00 705/15 |
| 2023/0325804 A1* | 10/2023 | Shao | G06F 8/71 705/23 |
| 2024/0054413 A1* | 2/2024 | Bakshi | G06F 40/40 |
| 2024/0378063 A1* | 11/2024 | Steele, III | G06F 9/451 |
| 2024/0378652 A1* | 11/2024 | Steele, III | G06F 3/0484 |

* cited by examiner

APPARATUS AND METHOD FOR GENERATING A USER INTERFACE AS A FUNCTION OF A SELECTED ACTION

FIELD OF THE INVENTION

The present invention generally relates to the field of data activation. In particular, the present invention is directed to apparatus and method for generating a user interface as a function of a selected action.

BACKGROUND

There is a need for improved methods of generating user interfaces as a function of selected actions. Existing methods do not adequately leverage interactivity and responsiveness in user interfaces. For example, existing user interfaces do not possess adequate ability to automatically and intelligently update in response to user verification and selections.

SUMMARY OF THE DISCLOSURE

In an aspect, apparatus for generating a user interface as a function of a selected action is disclosed. The apparatus includes at least a processor and a memory communicatively connected to the at least a processor, wherein the memory contains instructions configuring the at least a processor to receive at least a verification datum, authorize a user as a function of the at least a verification datum, wherein authorizing the user further includes retrieving user data as a function of the at least a verification datum, receive at least a selected action from a display device, generate an activation command as a function of the at least a selected action, wherein the activation command is configured to activate the at least a selected action and generating the activation command further includes generating at least a token as a function of the activation command and update a user interface data structure as a function of the at least a token.

In another aspect, a method for generating a user interface as a function of a selected action is disclosed. The method includes receiving, using at least a processor, at least a verification datum, authorizing, using the at least a processor, a user as a function of the at least a verification datum, wherein authorizing the user further includes retrieving user data as a function of the at least a verification datum, receiving, using the at least a processor, at least a selected action from a display device, generating, using the at least a processor, an activation command as a function of the at least a selected action, wherein the activation command is configured to activate the at least a selected action and generating the activation command further includes generating at least a token as a function of the activation command and updating, using the at least a processor, a user interface data structure as a function of the at least a token.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
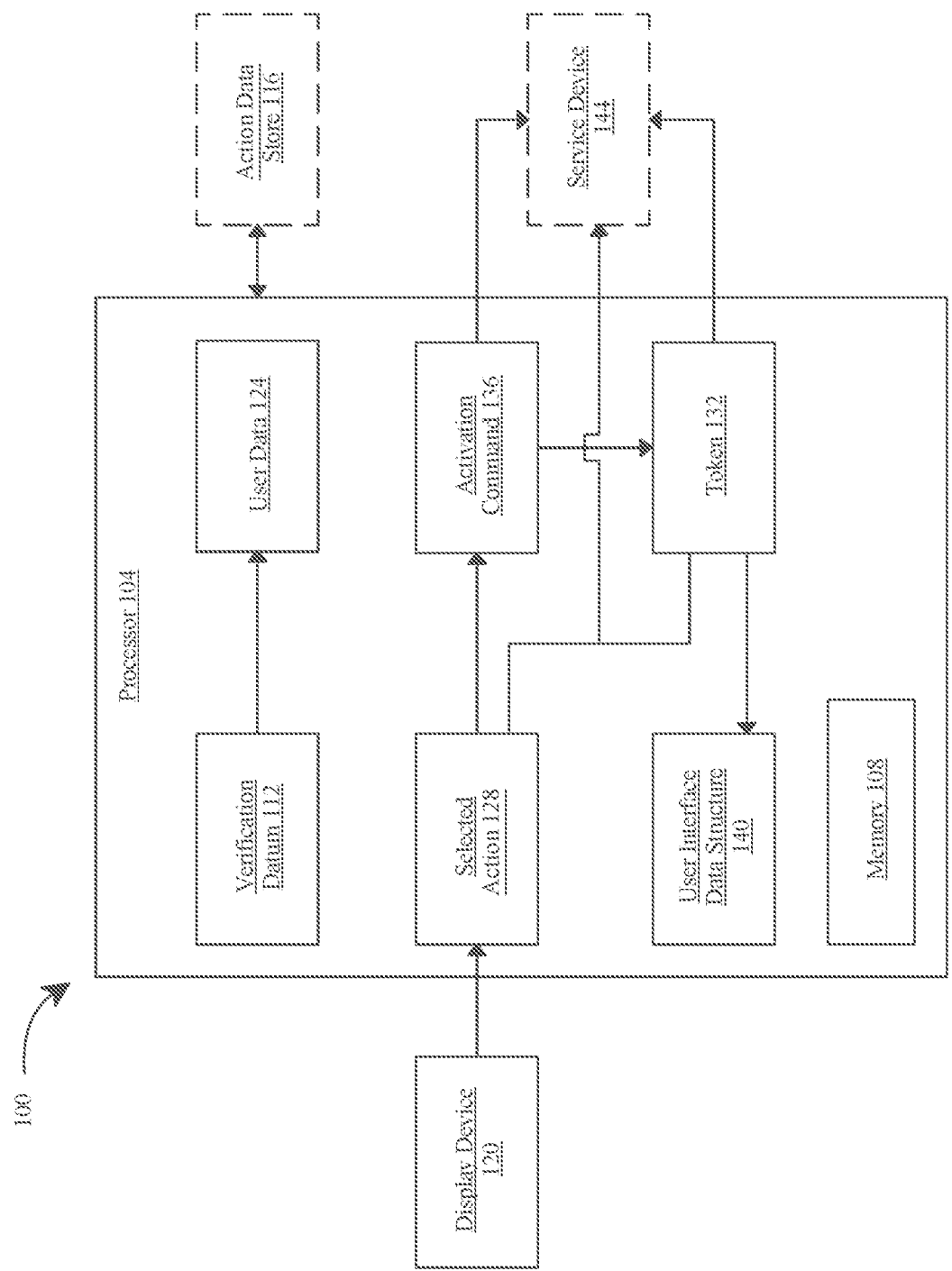
FIG. 1 illustrates a block diagram of an exemplary apparatus for generating a user interface as a function of a selected action.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating a user interface as a function of a selected action. The apparatus includes at least a processor and a memory communicatively connected to the at least a processor, wherein the memory contains instructions configuring the at least a processor to receive at least a verification datum, authorize a user as a function of the at least a verification datum, wherein authorizing the user further includes retrieving user data as a function of the at least a verification datum, receive at least a selected action from a display device, generate an activation command as a function of the at least a selected action, wherein the activation command is configured to activate the at least a selected action and generating the activation command further includes generating at least a token as a function of the activation command and update a user interface data structure as a function of the at least a token. Exemplary embodiments illustrating aspects of the present disclosure are described below in the context of several specific examples.

In an embodiment, apparatus and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

In some embodiments, apparatus and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

In an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

Embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

In an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

Embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

In some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

In some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

Referring now to FIG. 1, an exemplary embodiment of an apparatus 100 for generating a user interface as a function of a selected action is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive at least a verification datum 112. For the purposes of this disclosure, a "verification datum" is an element of data configured to verify a user or user's vehicle. In some embodiments, user credential may include a vehicle unique identifier. In some embodiments, verification datum 112 may include a vehicle unique identifier. For the purposes of this disclosure, a "vehicle unique identifier" is a symbol or plurality of symbols configured to identify a vehicle. In some embodiments, processor 104 may be configured to receive a vehicle unique identifier from image data. A symbol may include a mark or character used as a conventional representation of an object, function, or process, and the like. In some embodiments, vehicle unique identifier may include a symbol or plurality of symbols located on a license plate, also referred to as a vehicle credential plate or a vehicle credential, of a vehicle. In a non-limiting example, vehicle unique identifier may include a character such as, without limitation, a letter, a number, or a special character. In a non-limiting example, image data may contain and image of a vehicle license plate, wherein the plurality of vehicle unique identifier may include a combination of letters, numbers, and/or special characters, horizontal or vertical stacked in single, or multiple rows within license plate region, such as the license plate number. In some cases, each vehicle unique identifier of plurality of vehicle unique identifiers may include a same/different font size (i.e., 6 inches by 12 inches, 520 mm by 110 mm. 372 mm by 134 mm, and/or the like) or a same/different font style (e.g., standard, embossed, italic, condensed, gothic, retro, and/or the like), In some cases, each vehicle unique identifier of plurality of vehicle unique identifiers may be in a same/different font color (e.g., white, green, blue, yellow, black, red, and/or the like) Additionally, or alternatively, vehicle unique identifier may include a presence of other elements within the license plate region, such as, without limitation, jurisdiction name, logo/emblem/symbol, registration sticker, hologram, or the like. Further, vehicle unique identifier may be in a computer readable format; for instance, and without limitation, vehicle unique identifier may be expressed solely in textural/numerical format. Additional disclosure related to vehicle unique identifier may be found in U.S. patent application Ser. No. 18/195,537, filed on May 10, 2023, entitled "APPARATUS AND METHOD FOR AUTOMATIC LICENSE PLATE RECOGNITION OF A VEHICLE," the entirety of which is incorporated as a reference. In some cases, verification datum 112 may be stored in action data store 116. In some embodiments, verification datum 112 may be retrieved from action data store 116. In some embodiments, verification datum 112 may be manually input by a user.

With continued reference to FIG. 1, in some embodiments, processor 104 may be configured to receive image data and obtain or generate verification datum 112 from image data. As used in this disclosure, "image data" is information representing at least a physical scene, space, and/or object. In some cases, image data may be generated by a camera. "Image data" may be used interchangeably through this disclosure with "image," where image is used as a noun. Image data may relate to an image of vehicle. An image may be optical, such as without limitation where at least an optic is used to generate an image of an object. An image may be material, such as without limitation when film is used to capture an image. An image may be digital, such as, without limitation, when represented as a bitmap. In a non-limiting example, plurality of image data may illustrate various components and/or features of the vehicle such as vehicle's body, color, make, model, license plate, and the like. In some cases, plurality of image data may be captured by plurality of image capturing device, as still images, or frames from a video stream. In other cases, plurality of image data may be taken as a "burst" of vehicle images by a plurality of image capturing devices, as a video feed including a live-streamed video of the vehicle. A "burst" of vehicle images, as described herein, is a set of images of a single object, such as the vehicle, taken in rapid succession. A burst may be performed by repeated manually actuated image captures, or may be an "automated burst," defined as a set of images that are automatically triggered by plurality of image capturing devices; an automated burst may be initiated by a manual actuation of, for example, without limitation, a camera button while in an automated burst mode configuring at least an image capture device of plurality of image capturing devices and/or any processor 104 to perform and/or command automated burst upon a manual actuation, or may be triggered by an automated process and/or module such as a program, hardware component, application, a command or instruction from a remote device, or the like.

With continued reference to FIG. 1, apparatus may receive image data from a plurality of image capturing devices. As used in this disclosure, an "image capturing device" is a device that is capable of acquiring visual information in a form of digital images or videos. In an embodiment, each image capturing device of plurality of image capturing devices may include a usage of a photosensitive element. In a non-limiting example, a plurality of image capturing devices may include a plurality of cameras. A "camera," as described herein, is a device that is configured to sense electromagnetic radiation, such as without limitation visible light, and generate an image representing the electromagnetic radiation. In some cases, the at least a camera may include one or more optics. For the purposes of this disclosure, an "optic" is a device that focuses and directs electromagnetic radiation to a target area. Exemplary non-limiting, the optics may include spherical lenses, aspherical lenses, reflectors, polarizers, filters, windows, aperture stops, and the like. In some cases, the at least a camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, the at least a camera may be sensitive within a non-visible range of electromagnetic radiation, such as without limitation infrared.

With continued reference to FIG. 1, an exemplary image capturing device may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video.

With continued reference to FIG. 1, image capturing device may be equipped with a machine vision system. A machine vision system may use images from at least a camera, to make a determination about a scene, space, and/or object. For example, in some cases a machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ¢ may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level. In some cases, a machine vision system may use a classifier, such as any classifier described throughout this disclosure.

With continued reference to FIG. 1, in some embodiments, plurality of image capturing devices may capture two or more perspectives for use in three-dimensional (3D) reconstruction. Plurality of image capturing devices may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL may operate at depth ranges of about 50 cm to about 300 cm. Persons skilled in the art, upon reviewing the entirety of this disclosure, will be aware of various types of cameras that may be used for the disclosure.

With continued reference to FIG. 1, processor 104 may identify a verification datum 112 from image data using optical character recognition techniques. In some embodiments, optical character recognition or optical character reader (OCR) includes automatic conversion of images of written (e.g., typed, handwritten or printed text) into machine-encoded text. In some cases, recognition of at least a keyword from an image component may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

With continued reference to FIG. 1, in some cases OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases. a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted feature can be compared with an abstract vector-like representation of a character, which might reduce to one or more glyph prototypes. General techniques of feature detection in computer vision are applicable to this type of OCR. In some embodiments, machine-learning process like nearest neighbor classifiers (e.g., k-nearest neighbors algorithm) can be used to compare image features with stored glyph features and choose a nearest match. OCR may employ any machine-learning process described in this disclosure, for example machine-learning processes as described throughout this disclosure. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

With continued reference to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool include OCRopus. OCRopus development is led by German Research Centre for Artificial Intelligence in Kaiserslautern, Germany. In some cases, OCR software may employ neural networks as described in this disclosure.

With continued reference to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, verification datum 112 may include user credentials. A "user credential" as described in the entirety of this disclosure, is a datum representing an identity, attribute, code, and/or characteristic specific to a user and/or user display device. For example, and without limitation, user credential may include a username and password unique to user and/or user display device. The username and password may include any alpha-numeric character, letter case, and/or special character. As a further example and without limitation, the user credential may include a digital certificate, such as a public key infrastructure (PKI) certificate.

With continued reference to FIG. 1, in some embodiments, receiving at least a verification datum 112 may include receiving user credential including a vehicle unique identifier, wherein receiving the user credential including the vehicle unique identifier may further include identifying the user credential including the vehicle unique identifier as a function of a vehicle image (i.e. image data) and a computer vision module and authenticating the user credential including the vehicle unique identifier as a function of a plurality of reference indicators. In some embodiments, processor 104 may include a computer vision module. As used in this disclosure, a "computer vision module" is a component of a processor that is configured to perform computer vision tasks. "Computer vision," as used in this disclosure is defined as a field of artificial intelligence (AI) enabling computing device to derive information from visual data such as images and/or videos. In some cases, computer vision tasks may include, without limitation, feature extraction, image/video interpretation, image/video analysis, and the like. In an embodiment, computer vision module may be configured to receive plurality of processed vehicle images and identify the user credential including the vehicle unique identifier. As used in this disclosure, "reference indicators" is a set of predefined indicators. In some cases, plurality of reference indicators may be predefined by user. An "indicator," as described herein, is a symbol illustrated on license plate of the vehicle. As a non-limiting example, indicator may include a vehicle unique identifier. In a non-limiting example, indicator may include a number, a letter, a special character, and/or the like. In some cases, plurality of reference indicators may include license plate number listed in the registration of user's vehicle (i.e., valid license plate number). Such reference indicators may be used to pull information such as, without limitation, vehicle information (e.g., vehicle make and model, vehicle registration information, VIN, and/or the like), user (i.e., vehicle owner) information (e.g., name, address, driver's license number, insurance information, accident history, and/or the like) from action data store 116 and authenticate user credential as a function of computer vision module. In some cases, authenticating user credentials including vehicle unique identifier may include matching user credentials including vehicle unique identifier to plurality of reference indicators. Plurality of reference indicators may be retrieved, by processor 104, through querying action data store 116. Processor 104 may be configured to iterate user credentials including vehicle unique identifier and compare each user credential of plurality of user credentials including vehicle unique identifier to corresponding reference indicator within plurality of reference indicators. Additional disclosure related to authenticating user credential as a function of reference indicator and computer vision module may be found in U.S. patent application Ser. No. 18/195,537, filed on May 10, 2023, entitled "APPARATUS AND METHOD FOR AUTOMATIC LICENSE PLATE RECOGNITION OF A VEHICLE," the entirety of which is incorporated as a reference.

With continued reference to FIG. 1, in some embodiments, processor 104 may receive verification datum or user credentials from display device 120. For the purposes of this disclosure, a "display device" is a device that presents visual information or data. As a non-limiting example, display device 120 may present visual information or data in one or more forms of text, graphics, images, video, and the like. Display device 120 may be configured to provide a way for a user to view and/or interact with information, including but not limited to verification datum 112, user data 124, selected action 128, token 132, activation command 136, user interface data structure 140, and/or the like. In some embodiments, display device 120 may include different technologies, such as liquid crystal display (LCD,) a light-emitting diode (LED,) organic light-emitting diode (OLED,) plasma, projection, touch screen, and/or the like. In some embodiments, display device 120 may include varying resolutions, sizes, and aspect ratios. In some embodiments, display device 120 may implement audio device, or the like.

With continued reference to FIG. 1, in some embodiments, display device 120 may include a user display device. For the purposes of this disclosure, a "user display device" is a display device personally owned by a user to input data. As a non-limiting example, user display device may include a laptop, desktop, tablet, mobile phone, smart phone, smart watch, smart headset, or things of the like. In some embodiments, user display device may include an interface configured to receive inputs from user; for instance, but not limited to, verification datum 112, user data 124, selected action 128, token 132, activation command 136, user interface data structure 140, or the like. In some embodiments, user may manually input any data into apparatus 100 using user display device. In some embodiments, user may have a capability to process, store or transmit any information independently.

With continued reference to FIG. 1, in some embodiments, display device 120 may include a shared display device. For the purposes of this disclosure, a "shared display device" is a display device that is designed for use by multiple users. In some embodiments, shared display device may be used by different users at different times. As a non-limiting example, shared display devices may include desktop computers, kiosks, screens, tablets, or the like. In some embodiments, shared display device may be incorporated with a service device 144. For the purposes of this disclosure, a "service device" is a device that is used to perform a service for a user. As a non-limiting example, service device 144 may include any equipment including vehicle care devices, car washes, laundry machines, parking meters, vending machines, arcade games that can be activated to provide a service to a user. As used in this disclosure, "vehicle care devices" are a broad category of equipment, tools, or otherwise machines used to perform a selected action related to a user's vehicle. As a non-limiting example, selected action may include vehicle care. In some cases, plurality of vehicle care devices may be designed to help maintain the appearance, performance, and/or longevity of vehicles by addressing various aspects of vehicle care such as exterior cleaning, interior cleaning, maintenance tasks, and the like. In a non-limiting embodiment, plurality of vehicle care devices may include a car wash equipment, wherein the car wash equipment is a device that are specifically designed to clean the exterior of a vehicle; for instance, and without limitation, car wash equipment may include an automated car wash system, a pressure washers, a foam applicator, and/or the like. In another non-limiting embodiment, plurality of vehicle care devices may include a vacuum machine, wherein the vacuum machine is an equipment used for cleaning the interior of a vehicle; for instance, and without limitation, vacuum machine may include a self-service vacuum machine, a commercial-grade vacuum cleaner designed for automotive use, and/or the like.

In another non-limiting embodiment, plurality of vehicle care devices may include a vending machine, wherein the vending machine is a machine that dispense various products; for instance, vending machine may be configured to dispense vehicle care products such as air fresheners, cleaning supplies, detailing tools, and the like. Such vending machine may allow users to conveniently purchase and apply these products to their vehicles. Other exemplary embodiments of vehicle care devices may include, without limitation, tire inflation device, fluid dispensing machine, diagnostic and maintenance tools (e.g., code readers, battery testers, tire pressure monitoring systems, etc.), and the like.

With continued reference to FIG. 1, in some embodiments, apparatus 100 may include an action data store 116. As used in this disclosure, "action data store" is a data structure configured to store data associated with a selected action. As a non-limiting example, action data store 116 may store verification datum 112, user data 124, selected action 128, token 132, activation command 136, user interface data structure 140, and the like. In one or more embodiments, action data store 116 may include inputted or calculated information and datum related to a verification datum 112, user data 124, selected action 128, token 132, activation command 136, user interface data structure 140, or the like. For the purposes of this disclosure, a "user" is any person or individual that is using or has used an apparatus. As a non-limiting example, the user may include a driver of a vehicle, a passenger of the vehicle, a car wash employee, a car wash employer, a technician, and the like. In some embodiments, a datum history may be stored in action data store 116. As a non-limiting example, the datum history may include real-time and/or previous inputted data related to verification datum 112, user data 124, selected action 128, token 132, activation command 136, user interface data structure 140, and the like. In one or more embodiments, action data store 116 may include real-time or previously determined data related to verification datum 112, user data 124, selected action 128, token 132, activation command 136, user interface data structure 140, or the like. As a non-limiting example, action data store 116 may include instructions from a user, who may be an expert user, a past user in embodiments disclosed herein, or the like, where the instructions may include examples of the data related to verification datum 112, user data 124, selected action 128, token 132, activation command 136, user interface data structure 140, or the like.

With continued reference to FIG. 1, in some embodiments, processor 104 may be communicatively connected with action data store 116. For example, and without limitation, in some cases, action data store 116 may be local to processor 104. In another example, and without limitation, action data store 116 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store action data store 116. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, action data store 116 may include keywords. As used in this disclosure, a "keyword" is an element of word or syntax used to identify and/or match elements to each other. For example, without limitation, the keyword may include "vehicle model" in the instance that a user, such as but not limited to a driver, a car wash employee, and the like, is looking for a model of a vehicle. In another non-limiting example, the keyword may include "SUV" in an example where the vehicle is a sport utility vehicle (SUV). For example, without limitation, keyword may include a name of a user in the instance that user is looking for information related to a specific user. As a non-limiting example, user may query action data store 116 for certain information using keyword. In another non-limiting example, keyword may include a name of service or product in the instance that user is looking for information related to a specific service or product.

With continued reference to FIG. 1, in some embodiments, action data store 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, memory contains instructions configuring processor 104 to authorize a user as a function of at least a verification datum 112. In some embodiments, processor 104 may incorporate a login portal for users to submit user credentials. In some embodiments, processor 104 may be configured to receive user credential associated with users from a user display device, compare the user credential to an authorized user credential stored within an authentication database, and bypass authentication for user display device based on the comparison of the user credential user display device to the authorized user credential stored within the authentication database. In some embodiments, action data store 116 may include authentication database. For the purposes of this disclosure, "authentication database" is a data structure that stores information related to authentication of a user or user display device. Processor 104 may manipulate any information of the entirety of this disclosure to be displayed to a user with varying authority or accessibility. Processor 104 may incorporate priority classifiers used to classify low, average, and high classification of authorized users or user display devices. users or user display devices with lower priority classifications detected by processor 104 may allow a limited amount of information (limited accessibility) or limited benefits to be displayed to user display devices for viewing by users with lower priority classification. In a non-limiting embodiment, processor 104 may detect users or user display devices with high priority classifications and transmit a robust information with full accessibility or better benefits. Persons of ordinary skill in the art, after viewing the entirety of this disclosure, would appreciate the various amount of information allowed to be viewed for different levels of authority. In a non-limiting embodiment, processor 104 may be used as a security measure for information. A person of ordinary skill in the art, after viewing the entirety of this disclosure, would appreciate the function of processor 104 in the context of secure data exchange. In some embodiments, processor 104 may authorize user using a vehicle unique identifier. In some embodiments, processor 104 may be configured to receive vehicle unique identifier associated with users from display device 120 or obtain vehicle unique identifier using a machine vision, OCR, or the like as described above, compare the vehicle unique identifier to an authorized vehicle unique identifier stored within an authentication database, and bypass authentication for user based on the comparison of the vehicle unique identifier to the authorized vehicle unique identifier stored within the authentication database.

With continued reference to FIG. 1, processor 104 is configured to retrieve user data 124 as a function of at least a verification datum 112. For the purposes of this disclosure, "user data" is data related to a user. In some embodiments, user data 124 may include information related to a user listed on legal documents, such as vehicle insurance, or users listed on an account, such as a client account of a carwash facility. As a non-limiting example, user data 124 may include name, gender, date of birth, residency, religion, driver history, occupation, family, billing information, contact information, emergency contact, driver's license, state ID, photo ID, billing information such as but not limited to payment method, payment information, payment history, and the like. In some embodiments, user data 124 may include vehicle data. For the purposes of this disclosure, "vehicle data" is data related to a user's vehicle. As a non-limiting example, the vehicle information of the vehicle data may include the make, model, model version, model year, manufacturer contact information, country of manufacturer, body type, color, coating, steering type, wheel type, tire size, tire type, number of wheels, standard seat number, optional seat number, engine specifications, engine capacity, fuel type, fuel tank capacity, average fuel consumption, maximum permissible weight, vehicle height, vehicle length, vehicle width, vehicle status, such as but not limited to damage status, presence of vehicle accessories, title records, theft records, accident records, insurance records, vehicle ID, interior fabric, license plate number, alphanumeric credential, and the like. In some embodiments alphanumeric credential may include a license plate number. For example, the license plate number of a vehicle may be identified then matched to vehicle data containing the same license plate number. In some embodiments, user data 124 may include action data. "Action data," as used herein, is information related to past selected action performed on a vehicle or for a user. As a non-limiting example, action data may include an action history such as but not limited to wash service history, vacuum service history, tire service history, ceramic coating service history, and the like. As a non-limiting example, action data may include user's action preference such as but not limited to washing preference for a carwash. Wash preferences may include soap type, water temperature, number of rinse and the like. In some embodiments, an action preference may relate to a digital content preference regarding what type of digital content should be displayed onto a vehicle during the carwash base. A digital content preference may be based on age, interests, and the like. In some embodiments, action data may be updated based on a generated activation command 136 as described further below.

With continued reference to FIG. 1, in some embodiments, processor 104 may retrieve vehicle data or user data 124 based on verification datum 112 utilizing a machine-learning model such as a classifier, as described further below. A verification datum classifier may be configured to receive verification datum 112 as an input and output correlating vehicle data or user data 124. Verification datum classifier training data set may correlate exemplary verification datum to exemplary user data or exemplary vehicle data. In some embodiments, verification datum classifier training data set may be stored in action data store 116. In some embodiments, verification datum classifier training data set may be received from one or more users, action data store 116, external computing devices, and/or previous iterations of processing. As a non-limiting example, verification datum classifier training data set may include instructions from a user, who may be an expert user, a past user in embodiments disclosed herein, or the like, which may be stored in memory and/or stored in action data store 116, where the instructions may include labeling of training examples. In some embodiments, verification datum classifier training data set may be updated iteratively on a feedback loop. As a non-limiting example, processor 104 may update verification datum classifier training data set iteratively on a feedback loop as a function of newly collected user data 124, vehicle data, verification datum 112, or the like. A "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. In some embodiments, generating training data and training machine-learning models may be simultaneous.

With continued reference to FIG. 1, processor 104 may be configured to generate a classifier (such as but not limited to verification datum classifier) using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)÷P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier (such as but not limited to verification datum classifier) using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in action data store 116, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, processor 104 may be configured to retrieve user data 124 as a function of verification datum 112 using a verification lookup table. For the purposes of this disclosure, a "verification lookup table" is a lookup table that relates verification datum to user data. In a non-limiting example, verification lookup table may correlate verification datum 112 to corresponding user data 124. A "lookup table," for the purposes of this disclosure, is an array of data that maps input values to output values. A lookup table may be used to replace a runtime computation with an array indexing operation. In an embodiment, the lookup table may include interpolation. For the purposes of this disclosure, an "interpolation" refers to a process for estimating values that lie between the range of known data. As a non-limiting example, the lookup table may include an output value for each of input values. When the lookup table does not define the input values, then the lookup table may estimate the output values based on the nearby table values. In another embodiment, the lookup table may include an extrapolation. For the purposes of this disclosure, an "extrapolation" refers to a process for estimating values that lie beyond the range of known data. As a non-limiting example, the lookup table may linearly extrapolate the nearest data to estimate an output value for an input beyond the data.

With continued reference to FIG. 1, in some embodiments, processor 104 may be configured to retrieve user preference for selected action 128 as a function of verification datum 112. Additional disclosure related to verification datum 112, user data 124 and retrieving user data 124 may be found in U.S. Non-provisional application Ser. No. 18/195,597, filed on May 10, 2023, and entitled "APPARATUS AND METHOD FOR GENERATING A VEHICLE MAINTENANCE ACTIVITY," U.S. Non-provisional application Ser. No. 18/195,760, filed on May 10, 2023, and entitled "APPARATUS AND METHOD OF VEHICLE PROFILING," and U.S. Non-provisional application Ser. No. 18/196,147, filed on May 11, 2023, and entitled "METHODS AND APPARATUSES FOR CAR WASH USER EXPERIENCE," the entirety of each of which are incorporated herein by reference.

With continued reference to FIG. 1, memory 108 contains instructions configuring processor 104 to receive at least a selected action 128. For the purposes of this disclosure, a "selected action" is any service that can be performed on a vehicle or for a user. As a non-limiting example, selected action 128 may include vehicle care, car washes, laundry, parking, vending machines, arcade games that can be activated to provide a service to a user. As used in this disclosure, a "vehicle care" is any action, service, or feature that may be offered at a vehicle service site or in association with any vehicle services. Vehicle may include, without limitation, car, truck, buses, motorcycles, boats, airplane, and the like. A "vehicle care site," for the purpose of this disclosure, is a location or establishment that offers vehicle care. In a non-limiting example, vehicle service site may include a car wash site. Vehicle care may include, without limitation, a car washing service, car vacuuming service, or the like. Action offered at vehicle service site may include purchasing snacks or vehicle related products, manually operating one or more devices installed at vehicle service site such as, without limitation, plurality of vehicle care devices as described in further detail below, accessing utilities at vehicle service site (e.g., restrooms or other compartments/areas), and the like. In another non-limiting example, vehicle care may further include vehicle maintenance services such as, oil change, tire rotation, brake inspection, air filter replacement, battery service, cooling system flush, transmission service, timing belt replacement, spark plug replacement, and the like at a vehicle service site such as an independent auto repair shop. In some embodiments, selected action 128 may be stored in action data store 116. In some embodiments, selected action 128 may be retrieved from action data store 116. In some embodiments, selected action 128 may include at least an action parameter. For the purposes of this disclosure, an "action parameter" is the specific settings, characteristics, and variables that define the operational behavior and performance of a service device 144. As a non-limiting example, action parameter may include soap mixture and water levels for car wash, frequency of wash, temperature of water, scent, types of coatings, types of tire shine, kinds of towels, vacuum duration, wash duration, water pressure, drying method, suction power, product dispensing method, or any kinds of options thereof that can be updated for a service or service device 144. Persons skilled in the art, upon reviewing the entirety of this disclosure, may appreciate various action parameters that can be used in apparatus 100.

With continued reference to FIG. 1, processor 104 is configured to receive selected action 128 and/or action parameter from a display device 120. In a non-limiting example, user May manually determine selected action 128 and/or action parameter from a plurality of selected actions 128 and/or plurality of action parameters displayed on display device 120; for instance, without limitation, user display device, shared display device, or the like. In another non-limiting example, processor 104 may retrieve previously used selected action 128 and/or action parameter from action data store 116 (e.g., action data of user data 124) and display on display device 120. The previously used selected action 128 and/or action parameter may be automatically selected and used for subsequent iteration of processing or a user may have a choice to select the previously used selected action 128 and/or action parameter or select new selected action 128 and/or action parameter. In some embodiments, processor 104 may set up a preference list of selected actions 128 and/or action parameter. As a non-limiting example, selected actions 128 that was used frequently may be set as a preferred selected action and/or preferred action parameter. In a non-limiting example, selected action 128 and/or action parameter that is set as preferred selected action may be permanent or temporary. For example, and without limitation, selected action 128 and/or action parameter that is set as preferred selected action and/or action parameter may be always shown to a user for showing the user an option to choose selected action 128 from the preferred selected action and/or action parameter or selected action 128 and/or action parameter may be displayed to the user for certain duration of time (i.e. 1 week, 2 weeks, 1 month, or the like) and disappear if there is no selected action 128 after the certain duration of time.

With continued reference to FIG. 1, in some embodiments, processor 104 may display, upon a receipt of selected action 128 and/or action parameter from display device 120, previously used selected action 128, previously used action parameter, preferred selected action and/or preferred action parameter. In a non-limiting example, when a user inputs a selected action 128 or action parameter that is not any of previously used selected action 128, previously used action parameter, preferred selected action and/or preferred action parameter, retrieved from action data store 116, then processor 104 may present previously used selected action 128, previously used action parameter, preferred selected action and/or preferred action parameter as a recommendation or suggestion to the user. The user may then choose to add one of the suggestions as selected action 128 or actin parameter or proceed with the input selected action 128 or action parameter. In another non-limiting example, when a user inputs a selected action 128 or action parameter that is only a portion of previously used selected action 128, previously used action parameter, preferred selected action and/or preferred action parameter, retrieved from action data store 116, then processor 104 may present the rest of previously used selected action 128, previously used action parameter, preferred selected action and/or preferred action parameter that was not inputted by the user as recommendation or suggestion.

With continued reference to FIG. 1, memory 108 contains instructions configuring processor 104 to generate an activation command 136 as a function of at least a selected action 128. For the purposes of this disclosure, an "activation command" is an instruction that directs the operation of a service device 144 to perform a selected action. Activation command 136 is configured to activate at least a selected action 128. Activation command 136 includes at least a service device identifier associated with at least a service device 144 associated with at least a selected action 128 and/or action parameter. In some cases, for example, and without limitation, when activation command 136 contains instructions that directs one or more operations (i.e. selected action 128) that require more than one service devices 144, activation command 136 may include a plurality of service device identifiers. A "service device identifier," for the purpose of this disclosure, is a unique identifier that distinguishes one service device 144 from other service devices 144. In an embodiment, service device identifier may include a combination of alphanumeric characters, codes, or symbols that represent a specific service device 144, enabling apparatus 100 to recognize, manage, and communicate with service device 144 efficiently. In some cases, at least a service device identifier may allow processor 104 to differentiate between plurality of service devices 144, ensuring that activation command 136 correctly target to the intended at least a service device 144 to perform selected action 128. In some cases, service device identifier may be generated and assigned, by processor 104, to each vehicle care device of plurality of service devices 144, or it may be pre-configured by the corresponding device manufacture. For instance, and without limitation, processor 104 may be configured to hash one or more service data into a service device identifier using one or more hashing algorithms as described above. In a non-limiting example, plurality of service devices 144 may include a plurality of self-service vacuum machines, vending machines, and/or car wash stations. Each service device 144 in apparatus 100 may be assigned a unique identifier (i.e., service device identifier) such as, without limitation, vac_01a (i.e., the first self-service vacuum machine located at the front of vehicle care site), vac_02a (i.e., the second self-service vacuum machine located at the front of vehicle care site), ven_ex01 (i.e., the first external vending machine providing vehicle care products), wash_01_auto (i.e., the first car wash station with an automatic brush system), wash_02_thp (i.e., the second car wash station with a touchless high-pressure system), and the like. By using these unique service device identifiers, apparatus 100 may effectively manage and control each service device 144 individually. For example, and without limitation, if a user selects a specific vacuum machine, processor 104 may be configured to transmit activation command 136 to "vac_01a" or "vac_02a" based on the user's choice, ensuring that the correct service device 144 is activated to perform selected action 128 and/or action parameter.

With continued reference to FIG. 1, memory 108 contains instructions configuring processor 104 to generate at least a token 132 as a function of activation command 136. As used in this disclosure, a "token" is a unique identifier that represents the user's access, authorization, initiation, or otherwise entitlement to activation command. For the purposes of this disclosure, a "unique identifier" is an identifier that is unique for an object among others. As a non-limiting example, token 132 may include a universal product code (barcode), radio-frequency identification (RFID), cryptographic hashes, primary key, a unique sequencing of alphanumeric symbols, or anything of the like. In some cases, token 132 may be a digital asset associated with the user. In a non-limiting example, token 132 may include a QR code associated with user. "QR code" or "Quick Response Code," for the purposes of this disclosure, is a two-dimensional barcode capable of containing data. A "barcode," for the purposes of this disclosure, is a machine-readable code in which processor may receive and convert into numbers, alphanumeric strings and the like. In a non-limiting example, QR code may consist of black and white squares arranged in a specific pattern, wherein activation command 136 may be encoded as a form. In some cases, QR code may include a static QR code, wherein the static QR code is a type of QR code that contains fixed, unchangeable data. For example, and without limitation, once static QR code is generated, information encoded in static QR code may not be modified. In a non-limiting example, generation of QR code may include utilizing, by processor 104, a QR code generator and/or software, wherein the QR code generator and/or software may receive activation command 136 and output a QR code that is associated with activation command 136, selected action 128, action parameter, user data 124, verification datum 112, and/or any other information related to a user. Processor 104 may generate a static QR code containing verification datum 112 or user data 124 such as a unique membership ID that links to the user's account, wherein the unique membership ID remains the same throughout the user's membership (even the user cancels the membership).

With continued reference to FIG. 1, in other cases, QR code may include a dynamic QR code. As used in this disclosure, a "dynamic QR code" is a type of QR code that contains changeable data. In an embodiment, dynamic QR code may be linked to processor 104 that allows encoded data to be updated or modified without changing, modifying, or otherwise regenerating the QR code (appearance). In some cases, dynamic QR code may be time-sensitive; for instance, and without limitation, dynamic QR code may include an expiration date or may be regenerated by processor 104 at each pre-determined time period. In a non-limiting example, processor 104 may generate a dynamic QR code containing user data 124 or verification datum 112 each time the user visits the vehicle care site, wherein the user profile may be updated by a user and/or apparatus 100 at any time. Token 132 may be used as user data 124 or verification datum 112 to gain access, for example without limitation, a loyalty program offered by the vehicle care site.

With further reference to FIG. 1, in some embodiments, token 132 may include a radio frequency identification (RFID) signal. As used in this disclosure, "radio frequency identification signal" is a user identification which uses radio waves to wirelessly identify and track users. In an embodiment, display device 120 may be enabled with Near Field Communication (NFC) technology. As used in this disclosure, a "Near Field Communication" is a technology that allows NFC enabled device to execute a plurality of communication protocols, thereby enabling a communication between NFC enabled device and an external device such as, without limitation, token scanning device containing an NFC reader, over a distance of 4 cm (1.5 inches) or less. For the purposes of this disclosure, a "token scanning device" is a device for scanning a token. In some embodiments, token scanning device may include an illumination system, a sensor, and a decoder. As used in this disclosure, an "NFC reader" is a device that allows two-way communication between electronic devices (e.g., NFC enabled user device and token reading device). NFC reader may support a plurality of radio-frequency (RF) protocols such as, without limitation, Zigbee, Bluetooth Low Energy, Wi-Fi, and the like thereof. In some embodiments, token scanning device containing NFC reader may initiate the communication; for instance, and without limitation, token scanning device may send one or more commands to NFC enabled display device 120 within a distance via magnetic field such as, without limitation, command to accept token 132, and/or any processing steps described below in this disclosure. In other cases, display device 120 with NFC enabled may automatically send token 132 to token scanning device containing the NFC reader, when the user approaches to vehicle care device at a certain distance (i.e. proximity datum as described below). In a non-limiting example, service device 144 may be able to function properly once NFC reader embedded within token scanning device successfully detect and read token 132 from NFC enabled display device 120. Further, NFC reader embedded within token scanning device may be implemented using a web NFC application programming interface (API) such as, without limitation, NDEFReader interface, wherein the web NFC API is a low-level API that provides sites/apps the ability to read and write to display device 120.

With continued reference to FIG. 1, in some embodiments, processor 104 may be configured to receive proximity datum using NFC. For the purposes of this disclosure, a "proximity datum" is an element of data that is related to proximity of a user display device and a service device 144. In a non-limiting example, proximity datum may include a proximity signal. In a non-limiting example, proximity signal may be indicative of user display device is within a predetermined range from service device 144. In some cases, a proximity signal may include an analog signal, a digital signal, an electrical signal, an optical signal, a fluidic signal, radio signal, or the like. In a non-limiting example, service device 144 that includes NFC reader detects a signal from user display device that the user display device, this may indicate that user display device is proximate to service device 144, then processor 104 may activate service device 144 using activation command 136 to initiate selected action 128 and/or action parameter. Continuing the non-limiting example, service device 144 that includes NFC reader no longer detect a signal from user display device that the user display device, this may indicate that user display device is far from service device 144, then processor 104 may deactivate service device 144 using activation command 136 to deactivate selected action 128 and/or action parameter.

With continued reference to FIG. 1, in some embodiments, processor 104 may be configured to deactivate selected action 128 as a function of an activation time threshold. For the purposes of this disclosure, an "activation time threshold" is a range of time that indicates the duration of activation of a selected action. As a non-limiting example, activation time threshold may include duration of time. For example, and without limitation, activation time threshold may include 5, 10, 15, 20, 30 minutes, or the like. In some embodiments, activation time threshold may be stored in action data store 116. In some embodiments, activation time threshold may be predetermined. In some embodiments, activation time threshold may be manually determined by a user. In some embodiments, processor 104 may use previously activation time threshold that was used in the previous iteration of processing. In a non-limiting example, processor 104 may deactivate service device 144 to deactivate selected action 128 and/or action parameter once action time threshold has passed after activation or initiation of selected action 128.

With continued reference to FIG. 1, in other embodiments, token 132 may include a Non-Fungible Token (NFT). As used in this disclosure, a "Non-Fungible Token" is a unique and non-interchangeable unit of data stored on an immutable sequence listing representing ownership of an asset and/or a financial interest. An immutable sequential listing may be, include and/or implement a ledger, where data entries that have been posted to the immutable sequential listing cannot be altered. An immutable sequential listing may include a directed acyclic graph. As used in this disclosure, a "ledger" is a digital immutable ledger where data entries may be posted and cannot be altered. Ledger may be distributed across some or all nodes on network, such as a peer-to-peer network, whereby each node replicates and saves an identical copy of ledger and updates itself independently. A common example of an immutable sequential listing is a blockchain. In a non-limiting example, token 132 may include a digital representation of a digital wallet associated with user, wherein the digital wallet may include a plurality of NFTs, wherein plurality of NFTs may prove ownership of an asset and/or financial interest. Processor 104 may be configured to record token 132 in immutable sequence listing and/or ledger. Apparatus 100 may utilize cryptographic keys and digital signatures to ensure network node security and/or authenticity. Apparatus 100 may utilize digitally signed assertions.

With continued reference to FIG. 1, in some embodiments, processor 104 may be configured to validate token 132 and activate activation command 136 as a function of validation of token 132. In some embodiments, token 132 may include an expiration date, restrictions, conditions, or the like. As a non-limiting example, if token 132 includes expiration date and the date a user wants to activate selected action 128 using token 132 has passed the expiration date, then processor 104 may reject token 132 to activate activation command 136 to activate selected action 128. Persons skilled in the art, upon reviewing the entirety of this disclosure, may appreciate various scenario of validation of token 132 and activation or deactivation of activation command 136 depending on the validation of token 132.

With continued reference to FIG. 1, memory 108 contains instructions configuring processor 104 to update a user interface data structure 140 as a function of at least a token 132. For the purposes of this disclosure, a "user interface data structure" is a structured organization of data related to an activation command. In some embodiments, user interface data structure 140 may provide a summarization, representation, or otherwise abstraction related to initiation or execution of activation command 136. In a non-limiting example, user interface data structure 140 may include a comprehensive report on the execution of activation command 136. In another non-limiting example, user interface data structure 140 may include a list of selected action 128 and/or action parameter that was or will be initiated or executed using activation command 136. In another non-limiting example, user interface data structure 140 may include a list of activation command 136 and detailed step-by-step guides of how the activation command 136 can be executed as well as estimated timeline for the execution. In another non-limiting example, user interface data structure 140 may include timestamp when a token 132 was scanned. In another non-limiting example, user interface data structure 140 may include previously used selected actions and action parameters, which can be selected by a user to be used again. In some embodiments, processor 104 may retrieve previously used selected actions and/or action parameters from action data store 116 and generate user interface data structure 140 that includes previously used selected actions and/or action parameters to display on display device 120. In some embodiments, processor 104 may query action data store 116 using verification datum 112 or user data 124 to obtain previously used selected actions and/or action parameters from action data store 116. In another non-limiting example, user interface data structure 140 may include activation command 136 and associated user data 124, token 132, verification datum 112, selected action 128, action parameter, or the like. In another non-limiting example, user interface data structure 140 may include a report of how activation command 136 was executed. In some embodiments, user interface data structure 140 may include a status of selected action 128 subsequent to the activation of the selected action 128.

With continued reference to FIG. 1, in some embodiments, user interface data structure 140 may include estimated time when selected action 128 can start. In a non-limiting example, when a certain selected action 128 is heavily booked (i.e. selected by multiple users to activate and use for the users), processor 104 may generate and display estimated time a user has to wait for selected action 128 to be initiated on display device 140. In some embodiments, each selected action 128 may include a designated duration, providing insight into the anticipated time required for its completion. In some embodiments, processor 104 may determine estimated time a user has to wait for selected action 128 to be initiated for a user if there are other users selected the same selected action 128. In a non-limiting example, if there are five other users selected same selected action 128 before a user and the selected action 128 includes 2 minutes of destinated duration, then processor 104 determine that estimated time to wait for the user is 10 minutes (i.e. 2 minutes×5 users) and display the estimated time (i.e. status of selected action 128) through user interface data structure 140 on display device 144.

With continued reference to FIG. 1, in another non-limiting example, user interface data structure 140 may include a list of suggested selected actions and/or suggested action parameters to a user. In some embodiments, processor 104 may be configured to determine selected action 128 and/or action parameter for a user. In some embodiments, processor 104 may determine selected action 128 and/or action parameter as a function of verification datum 112 and/or user data 124. In some embodiments, processor 104 may determine selected action 128 and/or action parameter using a machine-learning module. Machine-learning module disclosed herein is further described with respect to FIG. 3. In some cases, processor 104 may be configured to generate action training data. As a non-limiting example, action training data may include correlations between exemplary verification datum, exemplary user data, exemplary selected actions, exemplary action parameters, or the like. For example, and without limitation, action training data may include types of vehicle (vehicle data of user data 124) correlated to selected actions and action parameters for the specific type of vehicle. As a non-limiting example, processor 104 may determine action parameter that includes more expensive products and selected action 128 that includes higher end services for a user that has a luxury vehicle using an action machine-learning model trained with action training data. In some embodiments, action training data may be stored in action data store 116. In some embodiments, action training data may be received from one or more users, action data store 116, external computing devices, and/or previous iterations of processing. As a non-limiting example, action training data may include instructions from a user, who may be an expert user, a past user in embodiments disclosed herein, or the like, which may be stored in memory and/or stored in action data store 116, where the instructions may include labeling of training examples. In some embodiments, action training data may be updated iteratively on a feedback loop. As a non-limiting example, processor 104 may update action training data iteratively on a feedback loop as a function of newly collected verification datum 112, user data 124, selected action 128 selected by a user, action parameter selected by a user, previously used selected action 128, previously used action parameter, output of any machine-learning models, or the like. In some embodiments, processor 104 may be configured to generate action machine-learning model. In a non-limiting example, generating action machine-learning model may include training, retraining, or fine-tuning action machine-learning model using action training data or updated action training data. In a non-limiting example, action machine-learning model may include supervised learning algorithms; for instance, without limitation, decision trees, support vector machines, neural networks, or the like. In another non-limiting example, action machine-learning model may include unsupervised learning algorithms; for instance, without limitation, clustering algorithms, density-based methods, or the like. In some embodiments, processor 104 may be configured to determine selected action 128 and/or action parameter using action machine-learning model (i.e. trained or updated action machine-learning model). In some embodiments, a user may be classified to a user cohort and processor 104 may determine selected action 128 and/or action parameter based on the user cohort using a machine-learning module as described in detail with respect to FIG. 3 and the resulting output may be used to update action training data. In some embodiments, generating training data and training machine-learning models may be simultaneous. In some embodiments, user may be classified to a user cohort using a cohort classifier. Cohort classifier may be consistent with any classifier discussed in this disclosure. Cohort classifier may be trained on cohort training data, wherein the cohort training data may include user data correlated to user cohorts. In some embodiments, user may be classified to user cohorts based on user data. For example a user may be classified to an age cohort as a function of their age or birthday within user data. A user may be classified to a car cohort as a function of the car that they own. In some embodiments, a user may be classified to a prosperity cohort as a function of their car or income.

With continued reference to FIG. 1, in some embodiments, user interface data structure 140 may include a form of text, graph, trend line, chart, audio, animation, image, video, and the like. In some embodiments, user interface data structure 140 may include various format. As a non-limiting example, user interface data structure 140 may include PDF, DOC, XLS, HTML, PNC, JPEG, BMP, TIFF, MP4, or the like. In an embodiment, user interface data structure 140 may include a hard copy form. In another embodiment, user interface data structure 140 may include an electronic copy form. In some embodiments, user interface data structure 140 may be stored in action data store 116. In an embodiment, user interface data structure 140 may be retrieved from action data store 116. In some embodiments, user interface data structure 140 may be retrieved from an immutable sequence listing. In some embodiments, user interface data structure 140 may be retrieved from a cloud storage. In some embodiments, user interface data structure 140 may be displayed on display device 120. In some embodiments, user may manipulate user interface data structure 140 through user interface of display device 120.

With continued reference to FIG. 1, in some embodiments, processor 104 may be configured to generate a user interface displaying user interface data structure 140, activation command 136, selected action 128, action parameter, verification datum 112, token 132, user data 124, and the like. For the purposes of this disclosure, a "user interface" is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality. In some embodiments, a user may interact with the use interface using a computing device distinct from and communicatively connected to at least a processor 104. For example, a smart phone, smart, tablet, or laptop operated by a user. In an embodiment, user interface may include a graphical user interface. A "graphical user interface," as used herein, is a graphical form of user interface that allows users to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, GUI may include one or more event handlers. An "event handler," as used in this disclosure, is a callback routine that operates asynchronously once an event takes place. Event handlers may include, without limitation, one or more programs to perform one or more actions based on user input, such as generating pop-up windows, submitting forms, changing background colors of a webpage, selecting a button, and the like. Event handlers may be programmed for specific user input, such as, but not limited to, mouse clicks, mouse hovering, touchscreen input, keystrokes, and the like. For instance and without limitation, an event handler may be programmed to generate a pop-up window if a user double clicks on a specific icon. User input may include a manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI.

With continued reference to FIG. 1, in some embodiments, user interface data structure 140 may include an action execution datum. For the purposes of this disclosure, an "action execution datum" is a datum or an element of data that is related to a transaction related to a selected action. As a non-limiting example, action execution datum may include a fee for at least a selected action 128 and/or action parameter. In some embodiments, processor 104 may be configured to update action execution datum or user interface data structure 140 as a function of generation of token 132, once token 132 is scanned by token scanning device, or once selected action 128 that in activated or initiated using activation command 136 by scanning token 132 is completed (i.e. the status of the selected action 128 indicates that the selected action 128 is completed), or the like. In some embodiments, processor 104 may be configured to execute action execution datum of user interface data structure 140 as a function of generation of token 132, once token 132 is scanned by token scanning device, or once selected action 128 that in activated or initiated using activation command 136 by scanning token 132 is completed (i.e. the status of the selected action 128 indicates that the selected action 128 is completed), or the like. For the purposes of this disclosure, "executing" action execution datum refers to initiating transaction or making a payment for used services. In a non-limiting example, processor 104 may execute action execution datum using a digital wallet, payment information of user data 124 stored in action data store 116, or the like. In another non-limiting example, user may manually execute action execution datum. In some embodiments, user data 124 may optionally include one or more data elements that describe right. As used in this disclosure, a "right" refers to a specific privilege or permission for a service. In an embodiment, at least a right may include an entitlement granted to a vehicle, user, and/or any individual at vehicle care site (e.g., employee, visitor, guest, or the like) based on their relationship with vehicle care site (i.e., membership). As a non-limiting example, right may include a parking right (e.g., a reserved parking space). In another non-limiting example, a right may include access to one or more restricted areas (e.g., loading zone, maintenance area, secure facility, and/or the like). For another non-limiting example, right may include discounts or incentives; vehicle care site may offer discount or incentives for certain customers, such as user with membership or employee at vehicle care site. In a further non-limiting example, right may include a prepaid service (e.g., car washes, fuel purchases, maintenance services, and/or any vehicle care described in this disclosure with no additional payment required). In some embodiments, processor 104 may update action execution datum as a function of right of a user and execute the updated action execution datum. In some embodiments, processor 104 may generate token 132 that includes at least a right. For example, and without limitation, processor 104 may generate a barcode that gives discount or free service to a user; this may update action execution datum of user interface data structure 140 as a function of the usage of at least a right. For example, and without limitation, when a user uses token 132 that includes right, processor 104 may update action execution datum that reflects the usage of right.

Figure 2:
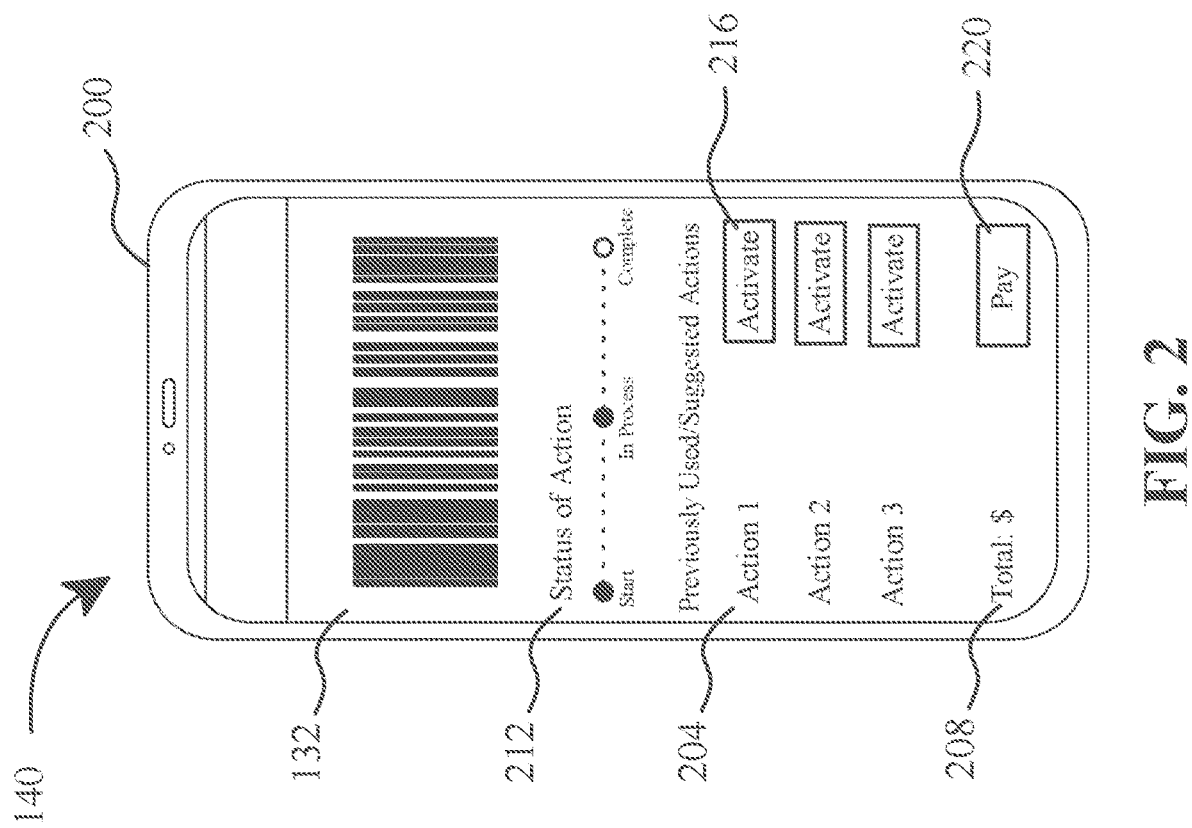
FIG. 2 illustrates a configuration of an exemplary user interface data structure displayed on a user display device.

Referring now to FIG. 2, a configuration of an exemplary user interface data structure 140 displayed on a user display device 200 is illustrated. As a non-limiting example, user display device 200 may include a laptop, desktop, tablet, mobile phone, smart phone, smart watch, smart headset, or things of the like. In some embodiments, user interface data structure 140 may include token 132. In some embodiments, user interface data structure 140 may include a list of previously used selected actions 204 and/or previously used action parameters. As a non-limiting example, user may select one or more previously used selected actions 204 to use as selected action 128. As another non-limiting example, when a user selects selected action 128 that is not previously used selected actions 204 or action parameters, or the user selects selected action 128 that is only a portion of previously used selected actions 204 or action parameters, then user interface data structure 140 may include previously used selected actions 204 or action parameters, or another portions of previously used selected actions 204 or action parameters that is not selected by the user. This may be displayed, for example, without limitation, as a pop-up window, user interface button, text message, user input field, or the like. In some embodiments, user interface data structure 140 may include a list of selected actions 128 and action parameters suggested by processor 104 or users.

With continued reference to FIG. 2, in some embodiments, user interface data structure 140 may include action execution datum 208. As a non-limiting example, action execution datum 208 may include a total amount of fee a user has to pay by activating selected action 128. In some embodiments, action execution datum 208 may be updated, automatically by a processor 104 or manually by a user, when token 132 is generated, once token 132 is scanned by token scanning device, or once selected action 128 that is activated or initiated using activation command 136 by scanning token 132 is completed (i.e. the status 212 of the selected action 128 indicates that the selected action 128 is completed), or the like. In a non-limiting example, status 212 of selected action 128 that is activated may be shown in various format. For example, and without limitation, status 212 may include text, bar, graph, image, video, icon, or the like. In a non-limiting example, status 212 may indicate activation, in process or completion of selected action 128 and/or action parameter or paid or unpaid, or the like of selected action 128. In another non-limiting example, status 212 may indicate timestamp of each status 212, estimation of duration, name of service device 144 activated for selected action 128, or the like. In some embodiments, status 212 can be visually communicated through various means, such as the display of an arrow, a dynamic blinking indicator, or analogous visual cues.

With continued reference to FIG. 2, in some embodiments, status 212 may be updated as a function of usage of token 132, execution of activation command 136, deactivation of selected action 128, selection of selected action 128, selecting an activation button 216 for selecting previously used selected action 204, previously used action parameter, suggested selected action or suggested action parameter, selection of payment button 220 to pay action execution datum 208 or automatic payment of action execution datum 208, or the like. For the purposes of this disclosure, an "activation button" is the interactive graphical interface element that selects a selected action. As a non-limiting example, a user may input selected action 128, action parameter, response to recommendation or suggestion, or the like using activation button 216. Activation button 216 illustrated in FIG. 2 is a mere example and activation button 216 may include various format and shape. For the purposes of this disclosure, a "payment button" is the interactive graphical interface element that initiate or execute a transaction. Payment button 220 illustrated in FIG. 2 is a mere example and payment button 220 may include various format and shape. In a non-limiting example, event handler may watch for the selection or manipulation of activation button 216 and/or payment button 220 and update status 212 in user interface data structure 140.

Figure 3:
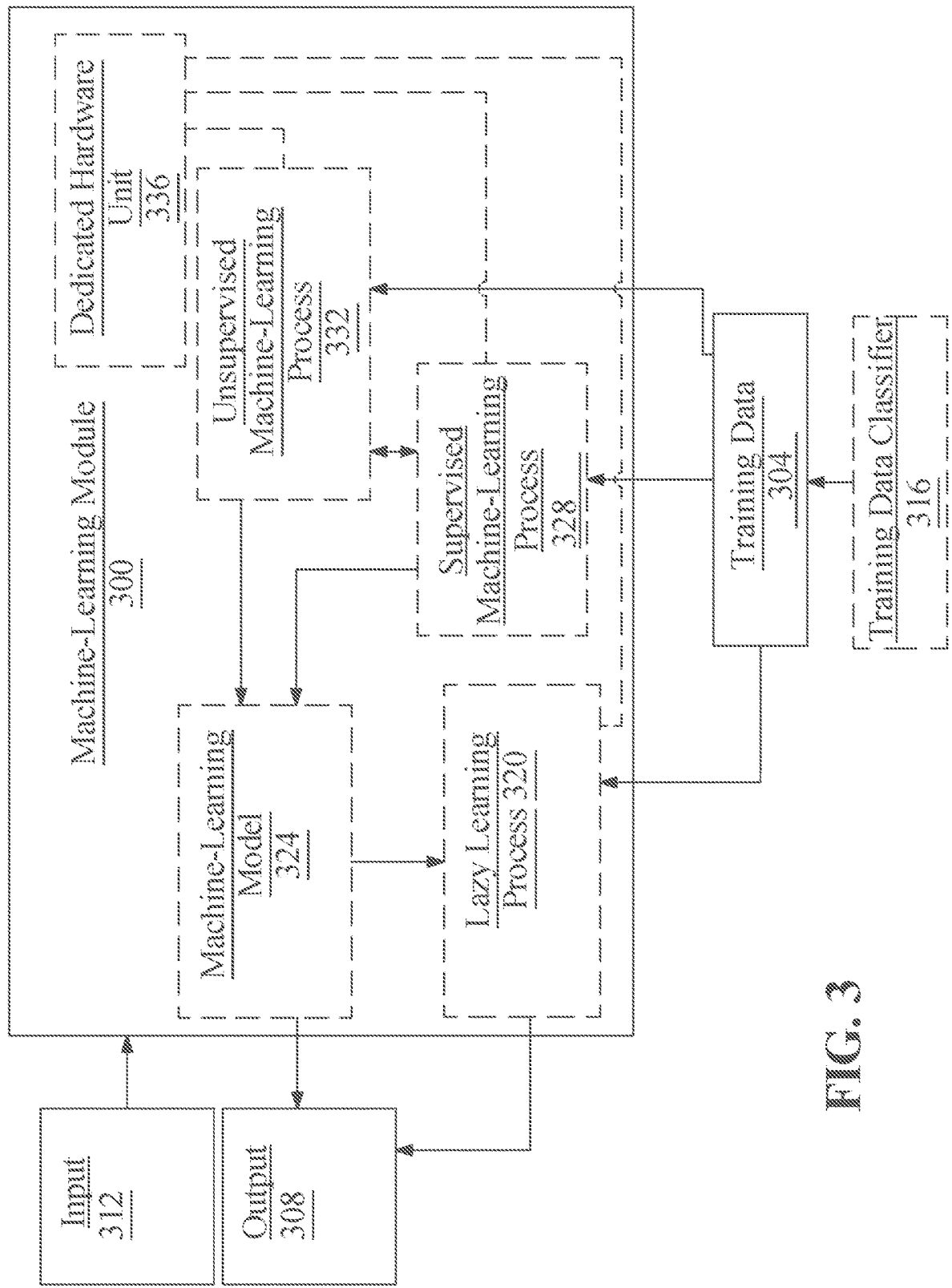
FIG. 3 illustrates a block diagram of an exemplary machine-learning process.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

With continued reference to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, input data may include verification datum 112, user data 124, selected action 128, token 132, activation command 136, or the like. As another non-limiting example, output data may include user data 124, selected action 128, token 132, activation command 136, or the like.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to a cohort of user, location of service device 144, or the like. For example, and without limitation, training data classifier 316 may classify elements of training data to gender, occupation, age, or the like of a user. For example, and without limitation, training data classifier 316 may classify elements of training data to classifications of locations of service device 144; for instance, but not limited to, country, state, city, or the like.

With continued reference to FIG. 3, computing device 304 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(A/B) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Computing device 304 may then calculate a likelihood table by calculating probabilities of different data entries and classification labels. Computing device 304 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, computing device 304 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 3, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

With continued reference to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, santization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 356 pixels, however a desired number of pixels may be 128. Processor may down-sample the high pixel count image to convert the 356 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}:X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation $\sigma$ of a set or subset of values:

$$X_{new} = \frac{X - X_{mean}}{\sigma}.$$

Scaling may be performed using a median value of a set or subset $X_{median}$ and/or interquartile range (IQR), which represents the difference between the $35^{th}$ percentile value and the $50^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

With continued reference to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include verification datum 112, user data 124, selected action 128, token 132, activation command 136, or the like as described above as inputs, user data 124, selected action 128, token 132, activation command 136, or the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

With continued reference to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
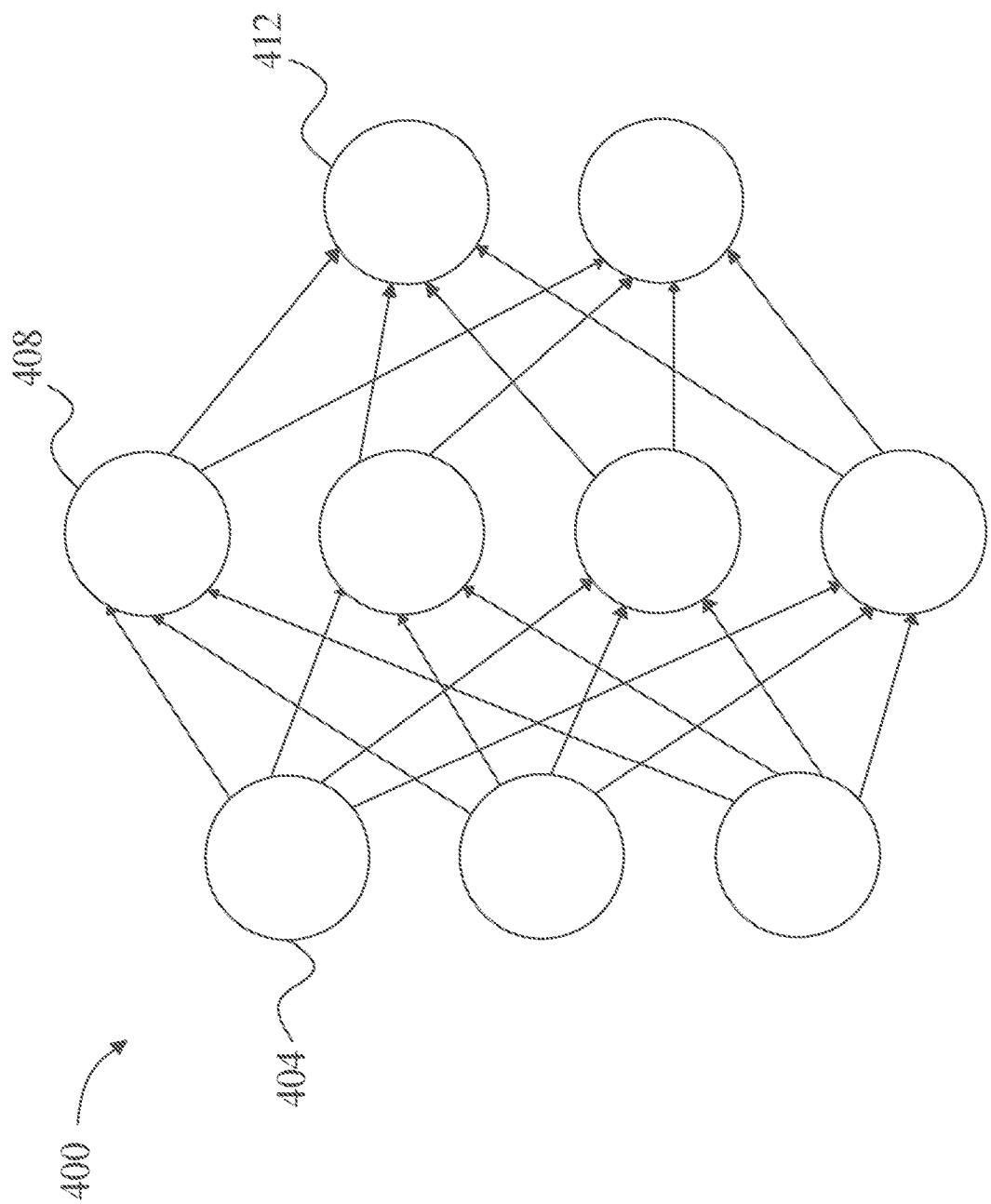
FIG. 4 illustrates an exemplary neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
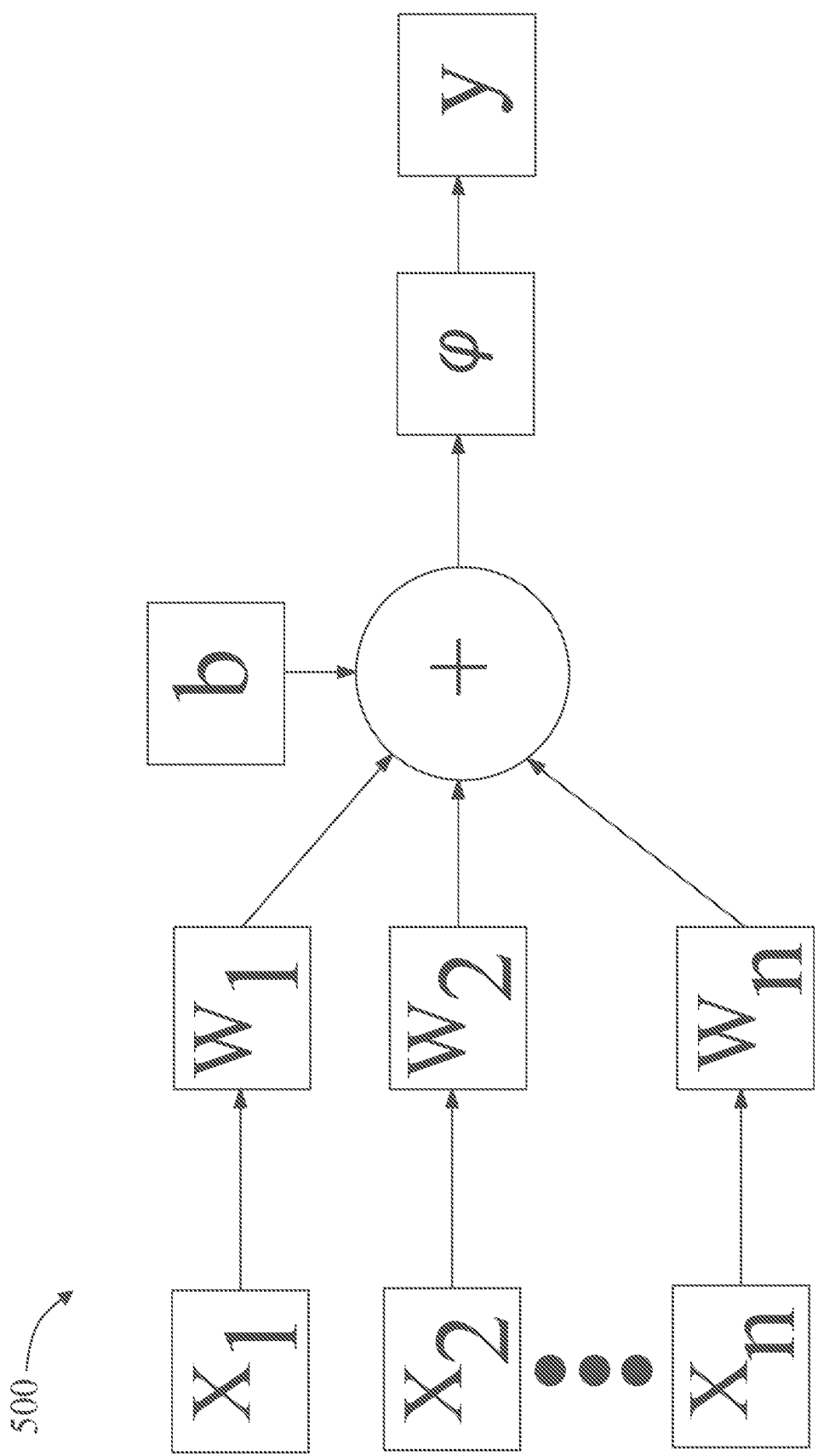
FIG. 5 illustrates an exemplary node of a neural network.

Referring now to FIG. 5 an exemplary embodiment of a node 500 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
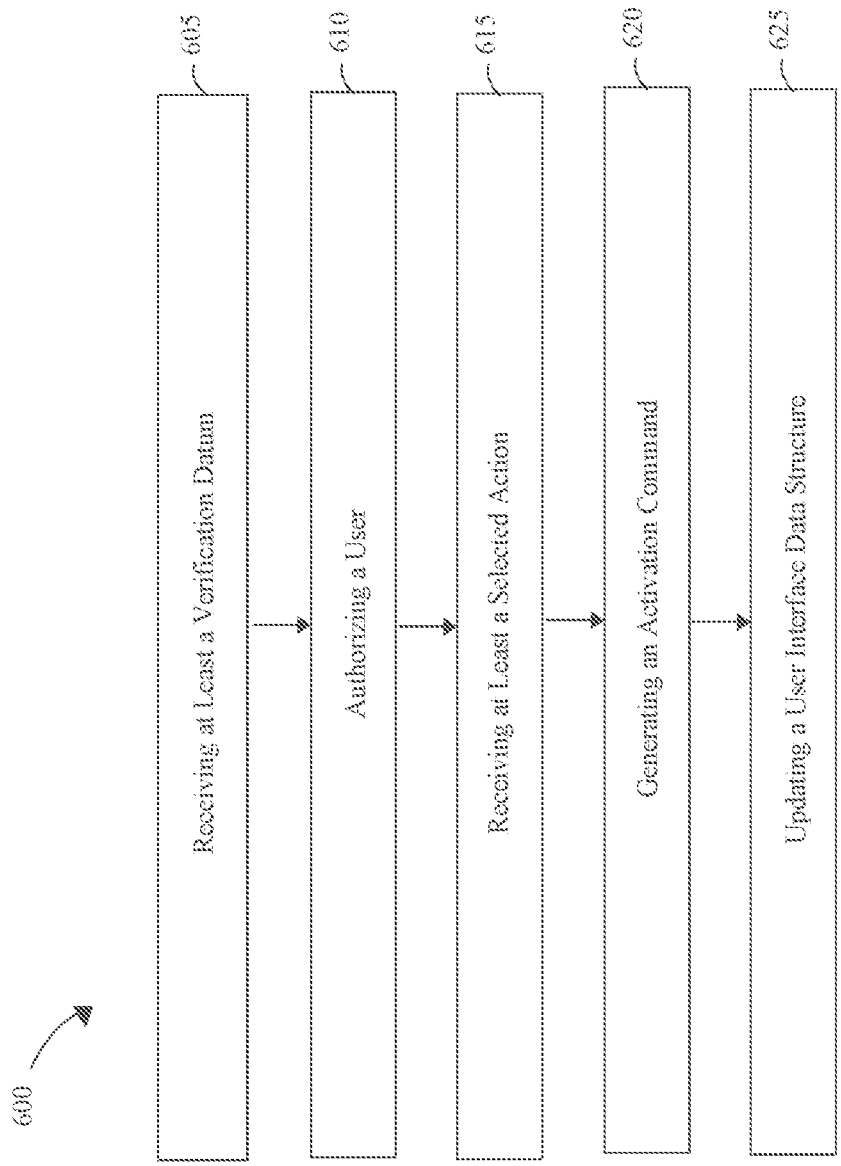
FIG. 6 illustrates a flow diagram of an exemplary method for generating a user interface as a function of a selected action.

Referring now to FIG. 6, a flow diagram of an exemplary method 600 for activating a selected action is illustrated. The method 600 includes a step 605 of receiving, using at least a processor, at least a verification datum. In some embodiments, method 600 may further include receiving, using the at least a processor, the user credential including a vehicle unique identifier, wherein receiving the user credential including the vehicle unique identifier may include identifying the user credential including the vehicle unique identifier as a function of a vehicle image and a computer vision module and authenticating the user credential including the vehicle unique identifier as a function of a plurality of reference indicators. In some embodiments, the at least a verification datum may include a user credential. These may be implemented as described with reference to FIGS. 1-5.

With continued reference to FIG. 6, method 600 includes a step 610 of authorizing, using at least a processor, a user as a function of at least a verification datum, wherein authorizing the user further includes retrieving user data as a function of the at least a verification datum. These may be implemented as described with reference to FIGS. 1-5.

With continued reference to FIG. 6, method 600 includes a step 615 of receiving, using at least a processor, at least a selected action from a display device. These may be implemented as described with reference to FIGS. 1-5.

With continued reference to FIG. 6, method 600 includes a step 620 of generating, using at least a processor, an activation command as a function of at least a selected action, wherein the activation command is configured to activate the at least a selected action and generating the activation command further includes generating at least a token as a function of the activation command. In some embodiments, method 600 may further include receiving, using the at least a processor, a proximity datum using a near-field communication. In some embodiments, method 600 may further include receiving, using the at least a processor, at least an action parameter from the display device and generating, using the at least a processor, the activation command as a function of the activation command. In some embodiments, method 600 may further include deactivating, using the at least a processor, the at least a selected action as a function of the proximity datum. In some embodiments, method 600 may further include deactivating, using the at least a processor, the at least a selected action as a function of an activation time threshold. These may be implemented as described with reference to FIGS. 1-5.

With continued reference to FIG. 6, method 600 includes a step 625 of updating, using at least a processor, a user interface data structure as a function of at least a token. In some embodiments, method 600 may further include updating, using the at least a processor, the user interface data structure to reflect a status of the selected action subsequent to the activation of the selected action. In some embodiments, method 600 may further include executing, using the at least a processor, an action execution datum of the user interface data structure as a function of the status of the selected action. In some embodiments, method 600 may further include generating, using the at least a processor, action training data, wherein the action training data comprises correlations between exemplary user data and exemplary selected actions, training, using the at least a processor, an action machine-learning model using the action training data and determining, using the at least a processor, the selected action as a function of the user data using the trained action machine-learning model. These may be implemented as described with reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
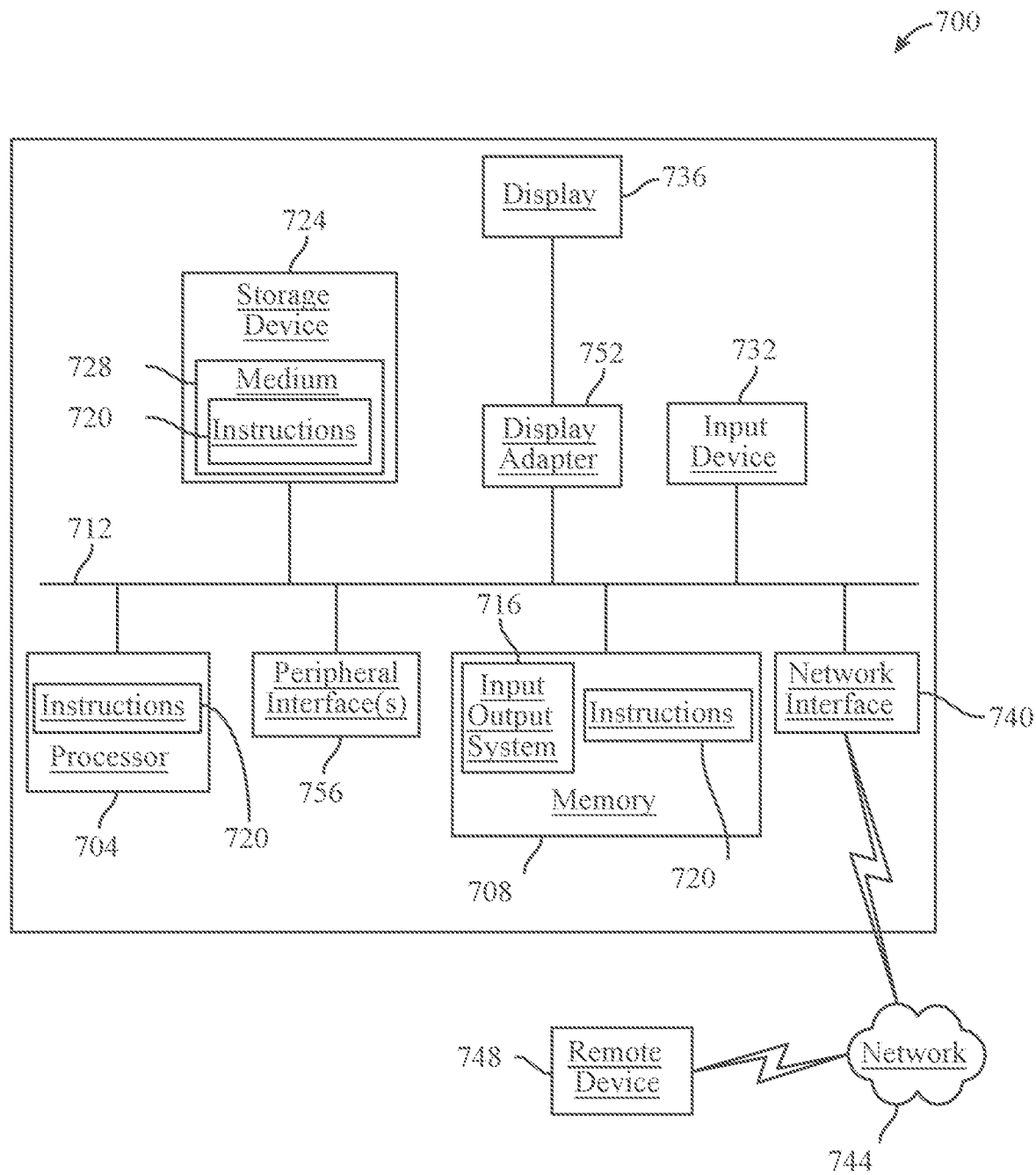
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and memory 708 that communicate with each other, and with other components, via a bus 712. Bus 712 may include any of several types of bus structures including, but not limited to, memory bus, memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a user interface as a function of a selected action, the apparatus comprising:
   at least a processor;
   at least an authentication database; and
   a memory communicatively connected to the at least a processor, wherein the memory contains instructions configuring the at least a processor to:
   receive at least a verification datum;
   authorize a user as a function of the at least a verification datum, wherein authorizing the user further comprises:
   retrieving user data as a function of the at least a verification datum, wherein the verification datum comprises a user credential of the user; and
   verifying the user credential to an authorized user credential stored within the authentication database;
   receive at least a selected action from a display device;
   generate an activation command as a function of the at least a selected action, wherein:
   the activation command is configured to activate the at least a selected action; and
   generating the activation command further comprises generating at least a token as a function of the activation command, wherein the at least a token comprises a Non-Fungible Token (NFT);
   update a user interface data structure as a function of the at least a token;
   validate the at least a token; and
   activate at least one service device using the activation command to initiate the at least a selected action as a function of the validation, wherein the at least one service device comprises a vehicle care device.

2. The apparatus of claim 1, wherein receiving the at least a verification datum comprises receiving the user credential comprising a vehicle unique identifier, wherein receiving the user credential comprising the vehicle unique identifier comprises:
   identifying the user credential comprising the vehicle unique identifier as a function of a vehicle image and a computer vision module; and
   authenticating the user credential comprising the vehicle unique identifier as a function of a plurality of reference indicators.

3. The apparatus of claim 1, wherein the memory contains instructions further configuring the at least a processor to:
   receive at least an action parameter from the display device; and
   generate the activation command as a function of the at least an action parameter.

4. The apparatus of claim 1, wherein the memory contains instructions further configuring the at least a processor to receive a proximity datum using a near-field communication.

5. The apparatus of claim 4, wherein the memory contains instructions further configuring the at least a processor to deactivate the at least a selected action as a function of the proximity datum.

6. The apparatus of claim 1, wherein the memory contains instructions further configuring the at least a processor to deactivate the at least a selected action as a function of an activation time threshold.

7. The apparatus of claim 1, wherein the memory contains instructions further configuring the at least a processor to update the user interface data structure to reflect a status of the selected action subsequent to the activation of the selected action.

8. The apparatus of claim 7, wherein:
   the user interface data structure comprises an action execution datum; and
   the memory contains instructions further configuring the at least a processor to execute the action execution datum of the user interface data structure as a function of the status of the selected action.

9. The apparatus of claim 1, wherein the memory contains instructions further configuring the at least a processor to:

generate action training data, wherein the action training data comprises correlations between exemplary user data and exemplary selected actions;
train an action machine-learning model using the action training data; and
determine the selected action as a function of the user data using the trained action machine-learning model.

10. A method for generating a user interface as a function of a selected action, the method comprising:
receiving, using at least a processor, at least a verification datum;
authorizing, using the at least a processor, a user as a function of the at least a verification datum, wherein authorizing the user further comprises:
retrieving user data as a function of the at least a verification datum, wherein the verification datum comprises a user credential of the user; and
verifying the user credential to an authorized user credential stored within an authentication database;
receiving, using the at least a processor, at least a selected action from a display device;
generating, using the at least a processor, an activation command as a function of the at least a selected action, wherein:
the activation command is configured to activate the at least a selected action; and
generating the activation command further comprises generating at least a token as a function of the activation command, wherein the at least a token comprises a Non-Fungible Token (NFT);
updating, using the at least a processor, a user interface data structure as a function of the at least a token;
validating, using the at least a processor, the at least a token; and
activating, using the at least a processor, at least one service device using the activation command to initiate the at least a selected action as a function of the validation, wherein the at least one service device comprises a vehicle care device.

11. The method of claim 10, further comprising:
receiving, using the at least a processor, the user credential comprising a vehicle unique identifier, wherein receiving the user credential comprising the vehicle unique identifier comprises:
identifying the user credential comprising the vehicle unique identifier as a function of a vehicle image and a computer vision module; and
authenticating the user credential comprising the vehicle unique identifier as a function of a plurality of reference indicators.

12. The method of claim 10, further comprising:
receiving, using the at least a processor, at least an action parameter from the display device; and
generating, using the at least a processor, the activation command as a function of the at least an action parameter.

13. The method of claim 10, further comprising:
receiving, using the at least a processor, a proximity datum using a near-field communication.

14. The method of claim 13, further comprising:
deactivating, using the at least a processor, the at least a selected action as a function of the proximity datum.

15. The method of claim 10, further comprising:
deactivating, using the at least a processor, the at least a selected action as a function of an activation time threshold.

16. The method of claim 10, further comprising:
updating, using the at least a processor, the user interface data structure to reflect a status of the selected action subsequent to the activation of the selected action.

17. The method of claim 16, further comprising:
executing, using the at least a processor, an action execution datum of the user interface data structure as a function of the status of the selected action.

18. The method of claim 10, further comprising:
generating, using the at least a processor, action training data, wherein the action training data comprises correlations between exemplary user data and exemplary selected actions;
training, using the at least a processor, an action machine-learning model using the action training data; and
determining, using the at least a processor, the selected action as a function of the user data using the trained action machine-learning model.

19. The apparatus of claim 1, wherein verifying the user credential further comprises comparing the user credential to the authorized user credential stored within the authentication database to determine if an authentication is bypassable based on the comparison.

20. The method of claim 10, further comprising:
comparing the user credential to the authorized user credential stored within the authentication database to determine if an authentication is bypassable based on the comparison.

* * * * *